(12) United States Patent
Kim et al.

(10) Patent No.: US 10,664,861 B1
(45) Date of Patent: May 26, 2020

(54) GENERATING PROMOTION OFFERS AND PROVIDING ANALYTICS DATA

(71) Applicant: Groupon, Inc., Chicago, IL (US)

(72) Inventors: Ben Kim, Sunnyvale, CA (US); Joshua Puckett, Chicago, IL (US); Andrey Zaytsev, Los Altos, CA (US); Richard Park, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 13/833,548

(22) Filed: Mar. 15, 2013

Related U.S. Application Data

(60) Provisional application No. 61/618,338, filed on Mar. 30, 2012.

(51) Int. Cl.
*G06Q 30/02* (2012.01)

(52) U.S. Cl.
CPC ................ *G06Q 30/0244* (2013.01)

(58) Field of Classification Search
CPC .................................................. G06Q 30/0244
USPC ...................................................... 705/14.43
See application file for complete search history.

(56) References Cited

U.S. PATENT DOCUMENTS

| | | |
|---|---|---|
| 5,715,445 A | 2/1998 | Wolfe |
| 5,870,770 A | 2/1999 | Wolfe |
| 5,946,682 A | 8/1999 | Wolfe |
| 5,948,040 A | 9/1999 | DeLorme et al. |
| 5,970,470 A | 10/1999 | Walker et al. |
| 6,006,252 A | 12/1999 | Wolfe |
| 6,049,778 A | 4/2000 | Walker et al. |
| 6,101,484 A | 8/2000 | Halbert et al. |
| 6,128,599 A | 10/2000 | Walker et al. |

(Continued)

FOREIGN PATENT DOCUMENTS

| | | |
|---|---|---|
| KR | 10-2008-0036829 A | 4/2008 |
| WO | 00/79456 A2 | 12/2000 |

(Continued)

OTHER PUBLICATIONS

Office Action for U.S. Appl. No. 13/749,272 dated Feb. 13, 2015.

(Continued)

*Primary Examiner* — Azam A Ansari
(74) *Attorney, Agent, or Firm* — Alston & Bird LLP

(57) ABSTRACT

Provided herein are systems, methods and computer readable media for programmatically generating and/or revising promotions for a provider as well as generating and providing analytics data regarding currently offered promotions in real-time. In providing such functionality, the system can be configured to, for example, monitor and analyze various promotions, including current promotions and analytics data about promotion-related purchases, that enable the system to determine the relative successfulness of a promotion for a provider and/or category of provider. Upon determining what has been more successful or is expected to be a more successful promotion for a provider, the system can present the promotion to the provider for approval and/or make the promotion to consumers programmatically. In some embodiments, the system may be further configured to revise the promotion programmatically and/or upon receiving the provider's approval of the programmatically generated proposed edits to the promotion parameters.

25 Claims, 8 Drawing Sheets

(56) References Cited

U.S. PATENT DOCUMENTS

| | | | |
|---|---|---|---|
| 6,151,603 A | 11/2000 | Wolfe | |
| 6,154,172 A | 11/2000 | Piccionelli et al. | |
| 6,249,772 B1 | 6/2001 | Walker et al. | |
| 6,263,351 B1 | 7/2001 | Wolfe | |
| 6,269,343 B1 | 7/2001 | Pallakoff | |
| 6,292,813 B1 | 9/2001 | Wolfe | |
| 6,301,576 B1 | 10/2001 | Wolfe | |
| 6,327,573 B1 | 12/2001 | Walker et al. | |
| 6,336,131 B1 | 1/2002 | Wolfe | |
| 6,341,305 B2 | 1/2002 | Wolfe | |
| 6,384,850 B1 | 5/2002 | McNally et al. | |
| 6,415,262 B1 | 7/2002 | Walker et al. | |
| 6,463,265 B1 | 10/2002 | Cohen et al. | |
| 6,477,581 B1 | 11/2002 | Carpenter et al. | |
| 6,584,451 B1 | 6/2003 | Shoham et al. | |
| 6,604,089 B1 | 8/2003 | Van Horn et al. | |
| 6,604,103 B1 | 8/2003 | Wolfe | |
| 6,631,356 B1 | 10/2003 | Van Horn et al. | |
| 6,754,636 B1 | 6/2004 | Walker et al. | |
| 6,778,837 B2 | 8/2004 | Bade et al. | |
| 6,812,851 B1 | 11/2004 | Dukach et al. | |
| 6,836,476 B1 | 12/2004 | Dunn et al. | |
| 6,842,719 B1 | 1/2005 | Fitzpatrick et al. | |
| 6,876,983 B1 | 4/2005 | Goddard et al. | |
| 6,901,374 B1 | 5/2005 | Himes | |
| 6,918,039 B1 | 7/2005 | Hind et al. | |
| 6,928,416 B1 | 8/2005 | Bertash | |
| 6,931,130 B1 | 8/2005 | Kraft, IV et al. | |
| 6,934,690 B1 | 8/2005 | Van Horn et al. | |
| 6,937,868 B2 | 8/2005 | Himmel et al. | |
| 6,970,837 B1 | 11/2005 | Walker et al. | |
| 6,970,922 B1 | 11/2005 | Spector | |
| 6,985,879 B2 | 1/2006 | Walker et al. | |
| 7,000,116 B2 | 2/2006 | Bates et al. | |
| 7,007,013 B2 | 2/2006 | Davis, II et al. | |
| 7,039,603 B2 | 5/2006 | Walker et al. | |
| 7,043,526 B1 | 5/2006 | Wolfe | |
| 7,072,848 B2 | 7/2006 | Boyd et al. | |
| 7,080,029 B1 | 7/2006 | Fallside et al. | |
| 7,103,365 B2 | 9/2006 | Myllymaki | |
| 7,103,565 B1 | 9/2006 | Vaid | |
| 7,103,594 B1 | 9/2006 | Wolfe | |
| 7,107,228 B1 | 9/2006 | Walker et al. | |
| 7,107,230 B1 | 9/2006 | Halbert et al. | |
| 7,113,797 B2 | 9/2006 | Kelley et al. | |
| 7,124,099 B2 | 10/2006 | Mesaros | |
| 7,124,107 B1 | 10/2006 | Pishevar et al. | |
| 7,124,186 B2 | 10/2006 | Piccionelli | |
| 7,146,330 B1 | 12/2006 | Alon et al. | |
| 7,181,419 B1 | 2/2007 | Mesaros | |
| 7,194,427 B1 | 3/2007 | Van Horn et al. | |
| 7,236,944 B1 | 6/2007 | Schwartz et al. | |
| 7,246,310 B1 | 7/2007 | Wolfe | |
| 7,251,617 B1 | 7/2007 | Walker et al. | |
| 7,257,604 B1 | 8/2007 | Wolfe | |
| 7,263,498 B1 | 8/2007 | Van Horn et al. | |
| 7,274,941 B2 | 9/2007 | Cole et al. | |
| 7,289,815 B2 | 10/2007 | Gfeller et al. | |
| 7,302,638 B1 | 11/2007 | Wolfe | |
| 7,318,041 B2 | 1/2008 | Walker et al. | |
| 7,340,691 B2 | 3/2008 | Bassett et al. | |
| 7,349,879 B2 | 3/2008 | Alsberg et al. | |
| 7,363,246 B1 | 4/2008 | Van Horn et al. | |
| 7,376,580 B1 | 5/2008 | Walker et al. | |
| 7,406,332 B1 | 7/2008 | Gaillard et al. | |
| 7,409,429 B2 | 8/2008 | Saha et al. | |
| 7,428,418 B2 | 9/2008 | Cole et al. | |
| 7,430,521 B2 | 9/2008 | Walker et al. | |
| 7,433,874 B1 | 10/2008 | Wolfe | |
| 7,447,642 B2 | 11/2008 | Bodin | |
| 7,467,137 B1 | 12/2008 | Wolfe | |
| 7,469,138 B2 | 12/2008 | Dayar et al. | |
| 7,472,109 B2 | 12/2008 | Katibah et al. | |
| 7,480,627 B1 | 1/2009 | Van Horn et al. | |
| 7,529,542 B1 | 5/2009 | Chevion et al. | |
| 7,536,385 B1 | 5/2009 | Wolfe | |
| 7,539,742 B2 | 5/2009 | Spector | |
| 7,577,581 B1 | 8/2009 | Schuyler | |
| 7,589,628 B1 | 9/2009 | Brady, Jr. | |
| 7,613,631 B2 | 11/2009 | Walker et al. | |
| 7,627,498 B1 | 12/2009 | Walker et al. | |
| 7,643,836 B2 | 1/2010 | McMahan et al. | |
| 7,650,307 B2 | 1/2010 | Stuart | |
| 7,668,832 B2 * | 2/2010 | Yeh | G06F 17/3087 |
| | | | 705/14.58 |
| 7,672,897 B2 | 3/2010 | Chung et al. | |
| 7,689,468 B2 | 3/2010 | Walker et al. | |
| 7,689,469 B1 | 3/2010 | Mesaros | |
| 7,693,736 B1 | 4/2010 | Chu et al. | |
| 7,693,748 B1 | 4/2010 | Mesaros | |
| 7,693,752 B2 | 4/2010 | Jaramillo | |
| 7,702,560 B1 | 4/2010 | Wiesehuegel et al. | |
| 7,711,604 B1 | 5/2010 | Walker et al. | |
| 7,720,743 B1 | 5/2010 | Marks | |
| 7,725,480 B2 | 5/2010 | Bassett et al. | |
| 7,734,779 B1 | 6/2010 | Piccionelli | |
| 7,760,112 B2 | 7/2010 | Bauchot et al. | |
| 7,774,453 B2 | 8/2010 | Babu et al. | |
| 7,783,279 B2 | 8/2010 | Ramanathan et al. | |
| 7,788,281 B2 | 8/2010 | Cole et al. | |
| 7,791,487 B2 | 9/2010 | Meyer | |
| 7,792,297 B1 | 9/2010 | Piccionelli et al. | |
| 7,797,170 B2 | 9/2010 | Bodin | |
| 7,848,765 B2 | 12/2010 | Phillips et al. | |
| 7,860,753 B2 | 12/2010 | Walker et al. | |
| 7,870,229 B2 | 1/2011 | Spector | |
| 7,890,364 B2 | 2/2011 | Piccionelli | |
| 8,010,417 B2 | 8/2011 | Walker et al. | |
| 8,103,519 B2 | 1/2012 | Kramer et al. | |
| 8,108,249 B2 | 1/2012 | Schroeder et al. | |
| 8,131,619 B1 | 3/2012 | Veselka | |
| 8,150,735 B2 | 4/2012 | Walker et al. | |
| 8,284,061 B1 | 10/2012 | Dione | |
| 8,301,495 B2 | 10/2012 | Mason | |
| 8,355,948 B2 | 1/2013 | Mason | |
| 8,364,501 B2 | 1/2013 | Sapan | |
| 8,407,252 B2 | 3/2013 | Bennett et al. | |
| 8,650,072 B2 | 2/2014 | Mason et al. | |
| 10,235,696 B1 | 3/2019 | L'Huillier et al. | |
| 2002/0023010 A1 | 2/2002 | Rittmaster et al. | |
| 2002/0065713 A1 | 5/2002 | Awada et al. | |
| 2002/0103746 A1 | 8/2002 | Moffett | |
| 2002/0116260 A1 | 8/2002 | Szabo et al. | |
| 2002/0123930 A1 * | 9/2002 | Boyd | G06Q 30/02 |
| | | | 705/14.13 |
| 2002/0188511 A1 | 12/2002 | Johnson et al. | |
| 2003/0004802 A1 | 1/2003 | Callegari | |
| 2003/0018559 A1 | 1/2003 | Chung et al. | |
| 2003/0055765 A1 | 3/2003 | Bernhardt | |
| 2004/0039626 A1 | 2/2004 | Voorhees | |
| 2004/0116074 A1 | 6/2004 | Fujii et al. | |
| 2004/0117246 A1 | 6/2004 | Applebaum | |
| 2004/0148228 A1 | 7/2004 | Kwei | |
| 2004/0186789 A1 | 9/2004 | Nakashima | |
| 2004/0193489 A1 | 9/2004 | Boyd et al. | |
| 2004/0243478 A1 | 12/2004 | Walker et al. | |
| 2005/0043996 A1 | 2/2005 | Silver | |
| 2005/0075945 A1 | 4/2005 | Hodge et al. | |
| 2005/0102156 A1 | 5/2005 | Linduff | |
| 2005/0182680 A1 | 8/2005 | Jones et al. | |
| 2005/0221841 A1 | 10/2005 | Piccionelli et al. | |
| 2005/0245241 A1 | 11/2005 | Durand et al. | |
| 2006/0069619 A1 | 3/2006 | Walker et al. | |
| 2006/0085259 A1 | 4/2006 | Nicholas et al. | |
| 2006/0089882 A1 | 4/2006 | Shimansky | |
| 2006/0106678 A1 | 5/2006 | Walker et al. | |
| 2006/0161599 A1 | 7/2006 | Rosen | |
| 2006/0178932 A1 | 8/2006 | Lang | |
| 2006/0195368 A1 | 8/2006 | Walker et al. | |
| 2006/0218043 A1 | 9/2006 | Rosenzweig et al. | |
| 2006/0224465 A1 | 10/2006 | Walker et al. | |
| 2006/0224466 A1 | 10/2006 | Walker et al. | |
| 2006/0224467 A1 | 10/2006 | Walker et al. | |
| 2006/0235754 A1 | 10/2006 | Walker et al. | |

(56) References Cited

U.S. PATENT DOCUMENTS

| | | |
|---|---|---|
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061209 A1 | 3/2007 | Jackson |
| 2007/0061220 A1 | 3/2007 | Vaid |
| 2007/0150354 A1 | 6/2007 | Walker et al. |
| 2007/0150371 A1 | 6/2007 | Gangji |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0280269 A1 | 12/2007 | Rosenberg |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0015938 A1 | 1/2008 | Haddad et al. |
| 2008/0027810 A1 | 1/2008 | Lerner et al. |
| 2008/0040211 A1 | 2/2008 | Walker et al. |
| 2008/0052186 A1 | 2/2008 | Walker et al. |
| 2008/0052189 A1 | 2/2008 | Walker et al. |
| 2008/0065490 A1 | 3/2008 | Novick et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0162318 A1 | 7/2008 | Butler et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0208744 A1 | 8/2008 | Arthur et al. |
| 2008/0242514 A1 | 10/2008 | Piccionelli et al. |
| 2009/0006182 A1 | 1/2009 | Gammon |
| 2009/0024450 A1 | 1/2009 | Chen et al. |
| 2009/0024484 A1 | 1/2009 | Walker et al. |
| 2009/0027286 A1 | 1/2009 | Ohishi et al. |
| 2009/0030776 A1 | 1/2009 | Walker et al. |
| 2009/0037286 A1 | 2/2009 | Foster |
| 2009/0070263 A1 | 3/2009 | Davis et al. |
| 2009/0094109 A1 | 4/2009 | Aaronson et al. |
| 2009/0125414 A1 | 5/2009 | Kleinrock et al. |
| 2009/0150218 A1 | 6/2009 | Brunner et al. |
| 2009/0167553 A1 | 7/2009 | Hong et al. |
| 2009/0192935 A1 | 7/2009 | Griffin et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0063870 A1 | 3/2010 | Anderson et al. |
| 2010/0070303 A1 | 3/2010 | Massoumi et al. |
| 2010/0076832 A1 | 3/2010 | Cha |
| 2010/0082481 A1 | 4/2010 | Lin et al. |
| 2010/0094701 A1 | 4/2010 | Ghosh et al. |
| 2010/0114132 A1 | 5/2010 | Piccionelli et al. |
| 2010/0146604 A1 | 6/2010 | Piccionelli |
| 2010/0185465 A1 | 7/2010 | Rana et al. |
| 2010/0205004 A1 | 8/2010 | Aldrich |
| 2010/0241513 A1 | 9/2010 | Prasad et al. |
| 2010/0287103 A1 | 11/2010 | Mason |
| 2011/0029362 A1 | 2/2011 | Roeding et al. |
| 2011/0029363 A1* | 2/2011 | Gillenson ............... G06Q 30/02 705/14.15 |
| 2011/0035266 A1 | 2/2011 | Patterson |
| 2011/0040609 A1 | 2/2011 | Hawkins et al. |
| 2011/0054996 A1 | 3/2011 | Spector |
| 2011/0099082 A1 | 4/2011 | Walker et al. |
| 2011/0153400 A1* | 6/2011 | Averbuch ............. G06Q 10/087 705/14.25 |
| 2011/0173096 A1 | 7/2011 | Bui |
| 2011/0218911 A1 | 9/2011 | Spodak |
| 2011/0231321 A1 | 9/2011 | Milne |
| 2011/0238499 A1 | 9/2011 | Blackhurst et al. |
| 2011/0313840 A1 | 12/2011 | Mason et al. |
| 2011/0313867 A9 | 12/2011 | Silver |
| 2012/0016745 A1 | 1/2012 | Hendrickson |
| 2012/0030002 A1 | 2/2012 | Bous et al. |
| 2012/0030066 A1 | 2/2012 | Stringfellow et al. |
| 2012/0036042 A1 | 2/2012 | Graylin et al. |
| 2012/0054031 A9 | 3/2012 | Pratt |
| 2012/0088487 A1 | 4/2012 | Khan |
| 2012/0095852 A1 | 4/2012 | Bauer et al. |
| 2012/0101889 A1 | 4/2012 | Kurata et al. |
| 2012/0130796 A1* | 5/2012 | Busch ................... G06Q 30/02 705/14.36 |
| 2012/0150603 A1 | 6/2012 | Bennett et al. |
| 2012/0172062 A1 | 7/2012 | Altman et al. |
| 2012/0173350 A1 | 7/2012 | Robson |
| 2012/0209730 A1 | 8/2012 | Garrett |
| 2012/0254020 A1 | 10/2012 | Debow |
| 2012/0259711 A1* | 10/2012 | Jabbawy ............ G06Q 30/0251 705/14.72 |
| 2012/0303434 A1 | 11/2012 | Postrel |
| 2013/0024364 A1 | 1/2013 | Katzin |
| 2013/0085804 A1* | 4/2013 | Leff et al. ................... 705/7.29 |
| 2013/0124281 A1 | 5/2013 | Evans et al. |
| 2013/0254104 A1 | 9/2013 | Fernandez |
| 2013/0275242 A1 | 10/2013 | Ramaratnam et al. |
| 2013/0317894 A1 | 11/2013 | Zhu et al. |
| 2014/0046757 A1 | 2/2014 | Kahn et al. |
| 2014/0074580 A1 | 3/2014 | Khuchua-Edelman et al. |
| 2014/0095232 A1 | 4/2014 | Shiva et al. |
| 2014/0122200 A1 | 5/2014 | Granville |
| 2014/0207584 A1 | 7/2014 | Wicha et al. |
| 2015/0046271 A1 | 2/2015 | Scholl et al. |

FOREIGN PATENT DOCUMENTS

| | | |
|---|---|---|
| WO | 00/79495 A2 | 12/2000 |
| WO | 01/08024 A2 | 2/2001 |
| WO | 01/11483 A2 | 2/2001 |
| WO | 01/50301 A2 | 7/2001 |
| WO | 2009/094385 A2 | 7/2009 |
| WO | 2011/112752 A1 | 9/2011 |
| WO | 2014/052882 A2 | 4/2014 |
| WO | 2014/062229 A1 | 4/2014 |
| WO | 2014/062230 A1 | 4/2014 |

OTHER PUBLICATIONS

Office Action for U.S. Appl. No. 13/839,226 dated Jun. 25, 2015.
Office Action for U.S. Appl. No. 13/839,226 dated Nov. 21, 2014.
U.S. Appl. No. 61/661,291, filed Jun. 18, 2012, in re: Kim et al. entitled *Facilitating Consumer Payments and Redemptions of Deal Offers*.
U.S. Appl. No. 61/682,762, filed Aug. 13, 2012, in re: Shariff et al. entitled *Unified payment and Return on Investment System*.
Office Action for U.S. Appl. No. 13/749,272 dated Oct. 26, 2015.
Office Action for U.S. Appl. No. 14/039,842 dated Dec. 9, 2015.
Office Action for U.S. Appl. No. 13/839,226 dated Mar. 16, 2016.
Office Action for U.S. Appl. No. 13/839,226 dated Sep. 30, 2016.
Notice of Allowance for U.S. Appl. No. 14/039,842 dated Oct. 18, 2016.
Office Action for U.S. Appl. No. 13/749,272 dated Nov. 3, 2016.
U.S. Provisional Patent Application filed Feb. 27, 2013, U.S. Appl. No. 61/770,174.
U.S. Provisional Application filed May 17, 2013; in re: Kahn et al., entitled Unified Payment and Return on Investment System, U.S. Appl. No. 61/824,850.
U.S. Provisional Application filed Mar. 30, 2012, in re: Kim entitled "Generating Deal Offers and Providing Analytics Data", U.S. Appl. No. 61/618,338.
U.S. Patent Application filed Sep. 28, 2012, in re: Shiva entitled "Scheduling Appointments With Deal Offers", U.S. Appl. No. 13/631,313.
U.S. Patent Application filed Mar. 15, 2013, U.S. Appl. No. 13/832,804.
PCT Written Openion of the International Searching Authority for Application PCT/US2013/033169 dated Jun. 10, 2013.
PCT international Search Report for Application PCT/US2013/033169 dated Jun. 10, 2013.
PCT international Search Report and Written Openion of the International Searching Authority for Application PCT/US2013/062389 dated May 27, 2014.

(56) References Cited

OTHER PUBLICATIONS

PCT international Search Report and Written Openion of the International Searching Authority for Application PCT/US2013/033145 dated Jun. 21, 2013.

PCT international Preliminary Report on Patentability for Application PCT/US2013/062389 dated Mar. 31, 2015.

PCT international Preliminary Report on Patentability for Application PCT/US2013/033169 dated Apr. 21, 2015.

PCT international Preliminary Report on Patentability for Application PCT/US2013/033145 dated Apr. 21, 2015.

"Next Step for Groupon Scheduler," Groublogpon—The Sereous Blog of Froupon, Mar. 18, 2012. [Retrieved from the Internet Mar. 26, 2012: <http://www.groupon.com/blog/cities.next-step-groupon-scheduler/>.

Staff, "ActBig.com muscles in on group buying power", RedHerring.com, Oct. 13, 1999.

Rueb, Emily S., "Group Buying, Better Together", The New York Times City Blog, Feb. 16, 2010, 3 pgs.

Krishnan S. Anand and Ravi Aron (OPIM Department, The Wharton School, University of Pennsylvania), "Group Buying on the Web: A Comparison of Price Discovery Mechanisms", Management Science, vol. 49, No. 11, pp. 1546-1562, Nov. 2003.

Kauffman, Robert J. et al., "Bid Together, Buy Together: On the Efficacy of Group-Buying Business Models in Internet Based Selling", paper prepared for the 5th Annual University of Minnesota Electronic Commerce conference, Mar. 27-28, 2001, Carlson School of Management, University of Minnesota, MN, 44 pgs.

International Search Report and Written Opinion for Application No. PCT/US201.2/027616 dated Sep. 27, 2012.

Editor, "Technology Drives ActBig 'Next Generation' GroupBuying Application", Market Wire, Feb. 29, 2005.

Bermant, Charles, "ActBig: Save BiG", Internetnews.com, Nov. 16, 1999, 3 pgs.

Alan S. Davis "Group Buying on the Internet", Seminar Presentation Slides, University of Minnesota, MIS Research Center, Mar. 10, 2006.

\* cited by examiner

GENERATING PROMOTION OFFERS AND PROVIDING ANALYTICS DATA

CROSS-REFERENCE TO RELATED APPLICATIONS

This non-provisional application claims the benefit of U.S. Provisional Patent Application No. 61/618,338, filed Mar. 30, 2012, the entire contents of which are incorporated herein by reference.

TECHNICAL FIELD

Embodiments of the invention relate, generally, to promoting the offering of promotions by a provider to a consumer and providing analytics data.

BACKGROUND

Providers sell goods and services (collectively referred to herein as "goods") to consumers. The providers can often control the form of their product offers, the timing of their product offers, and the price at which the goods will be offered. The provider may sell goods at a brick-and-mortar sales location, a virtual online site, or both.

Discounts have been used as part of some retail strategies. Discount techniques include providing coupons and rebates to potential consumers, but these techniques have several disadvantages. In this regard, a number of deficiencies and problems associated with the systems used to, among other things, provide discounts to consumers have been identified. Through applied effort, ingenuity, and innovation, many of these identified problems have been solved by developing solutions that are included in embodiments of the present invention, many examples of which are described in detail herein.

BRIEF SUMMARY

In general, embodiments of the present invention provide herein systems, methods and computer readable media for programmatically generating and/or revising promotion offers for a provider as well as generating and providing analytics data regarding currently offered promotions in real-time. In providing such functionality, the system can be configured to, for example, monitor and analyze various promotion offers, including current promotion offers and analytics data about promotion-related purchases, that enable the system to determine the relative successfulness of a promotion offer for a provider and/or category of provider. Upon determining what has been more successful or is expected to be a more successful promotion offer for a provider, the system can present the promotion offer to the provider for approval and/or make the promotion offer to consumers programmatically by a promotional system located remotely from the provider device and the consumer device. In some embodiments, the remotely located promotional system may be further configured to revise the promotion offer programmatically and/or upon receiving the provider's approval of the proposed edits to the promotion offer.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
FIGS. 1-3 illustrate example graphical user interface displays that may be presented by various components of systems in accordance with some embodiments discussed herein.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

As used herein, the term "provider," "merchant," and similar terms may be used interchangeably to refer to, but not limited to, a merchant, business owner, consigner, shopkeeper, tradesperson, vender, operator, entrepreneur, agent, promotioner, organization or the like that is in the business of a providing a good, service or experience to a consumer, facilitating the provision of a good, service or experience to a consumer and/or otherwise operating in the stream of commerce. For example, a provider may be in the form of a restaurant that that provides food, beverages, and other consumables to a consumer.

In addition, as used herein, the term "promotion and marketing service" may include, but is not limited to, a service that is accessible via one or more computing devices and is operable to provide example promotion and/or marketing services on behalf of one or more providers that are offering one or more instruments that are redeemable by consumers for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "instrument" may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an instrument may include an electronic indication in a mobile application that shows $50 of value to spend at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impressions" may include, but is not limited to, a communication, a display, or other perceived indication, such as a flyer, print media, e-mail, text message, application alert, mobile applications, other type of electronic interface or distribution channel and/or the like, of one or more promotions. For example, and using the aforementioned restaurant as the example provider, an impression may include an e-mail communication sent to consumers that indicates the availability of a $25 for $50 towards food, beverages and/or other consumables.

Figure 2:
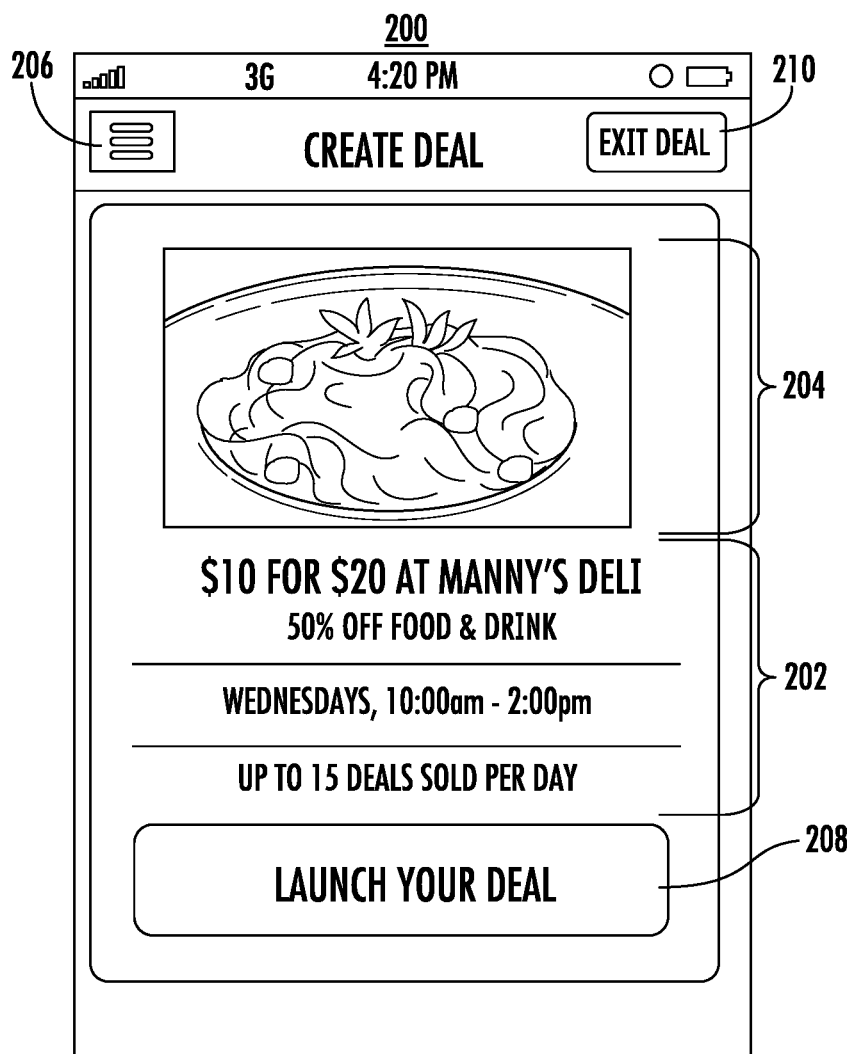
Figure 3:
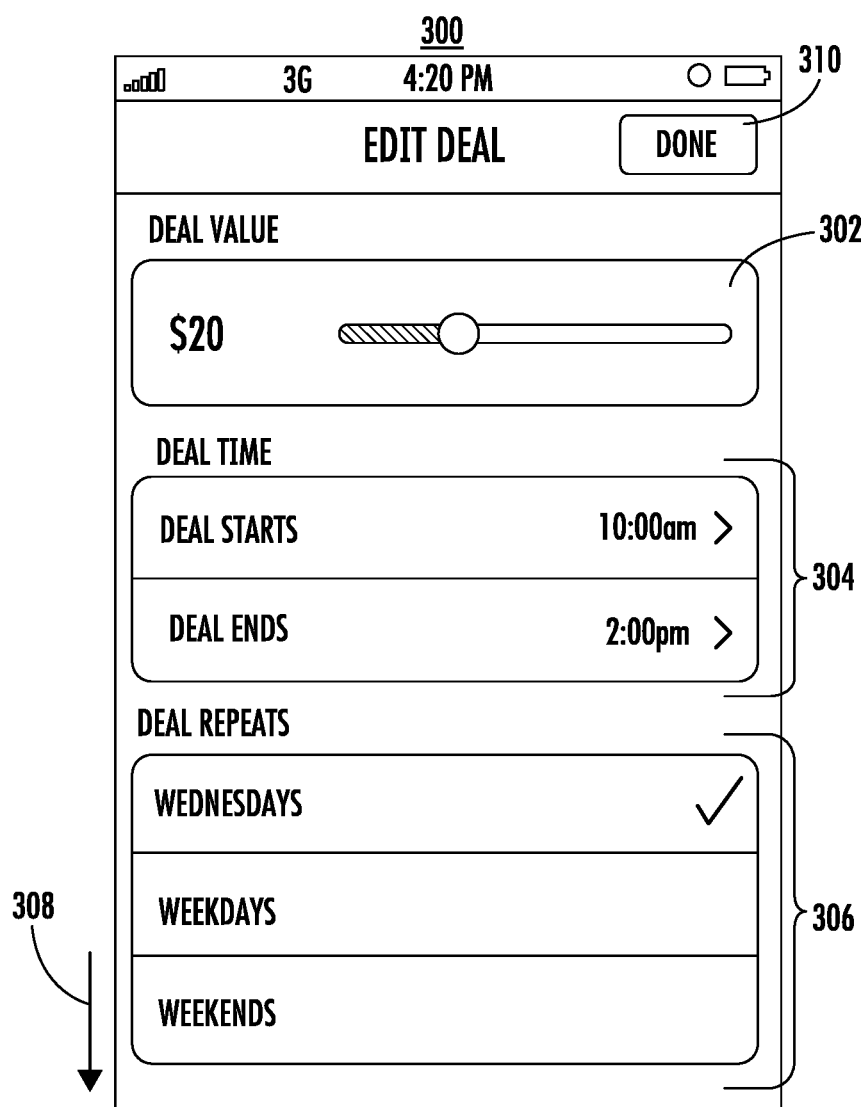

FIGS. 1-3 show example displays of an interface that may be presented by one or more display screens of one or more machines, sometimes referred to herein as "provider devices," in accordance with some embodiments discussed herein. For example, the displays of FIGS. 1-3 can be presented to a provider by a mobile, handheld provider device and can aid in facilitating the generation of an instrument, such as a coupon and/or other discount offer for a provider's good, service and/or experience, which are sometimes referred to herein as a "deal", "deal offer", "promotion" and/or a "promotion offer." The promotions generated in accordance with some embodiments discussed herein can then be presented to one or more consumers using machines, which are sometimes referred to herein as "consumer devices." Additional examples of provider devices and consumer machines are discussed in connection with FIGS. 8 and 9.

The displays of FIGS. 1-3 can be used to provide a relatively simple, quick, and intuitive way for the provider to create promotions by using one or more third party machines, sometimes referred to herein as "the promotional system." Additional examples of the promotional system are discussed in connection with FIGS. 8 and 9. Further examples of ways for the provider to create promotions and a consumer to redeem promotions are discussed in commonly-assigned U.S. Patent Application Publication No. 2011/0313840, filed Mar. 17, 2011, titled "SYSTEM AND METHODS FOR PROVIDING LOCATION BASED DISCOUNT RETAILING," which is hereby incorporated by reference in its entirety.

The displays of an interface, as shown in FIGS. 1-3, can be used to create and monitor the performance of promotions for goods having an expiration deadline in the relatively near future. In some embodiments, the goods expiration deadline can be calculated based on the provider's current bandwidth or availability for new business and/or product inventory stocks, which may likewise have a shelf-life that is due to expire in the relatively near-future. For example, a restaurant manager may use embodiments discussed herein to quickly offer a promotion while standing in his restaurant and seeing a number of empty tables that are not reserved for the next few hours. As another example, a fish market may use embodiments discussed herein to offer a "catch-of-the-day" promotion on a type of fish that produced a relatively large catch that morning.

Figure 4:
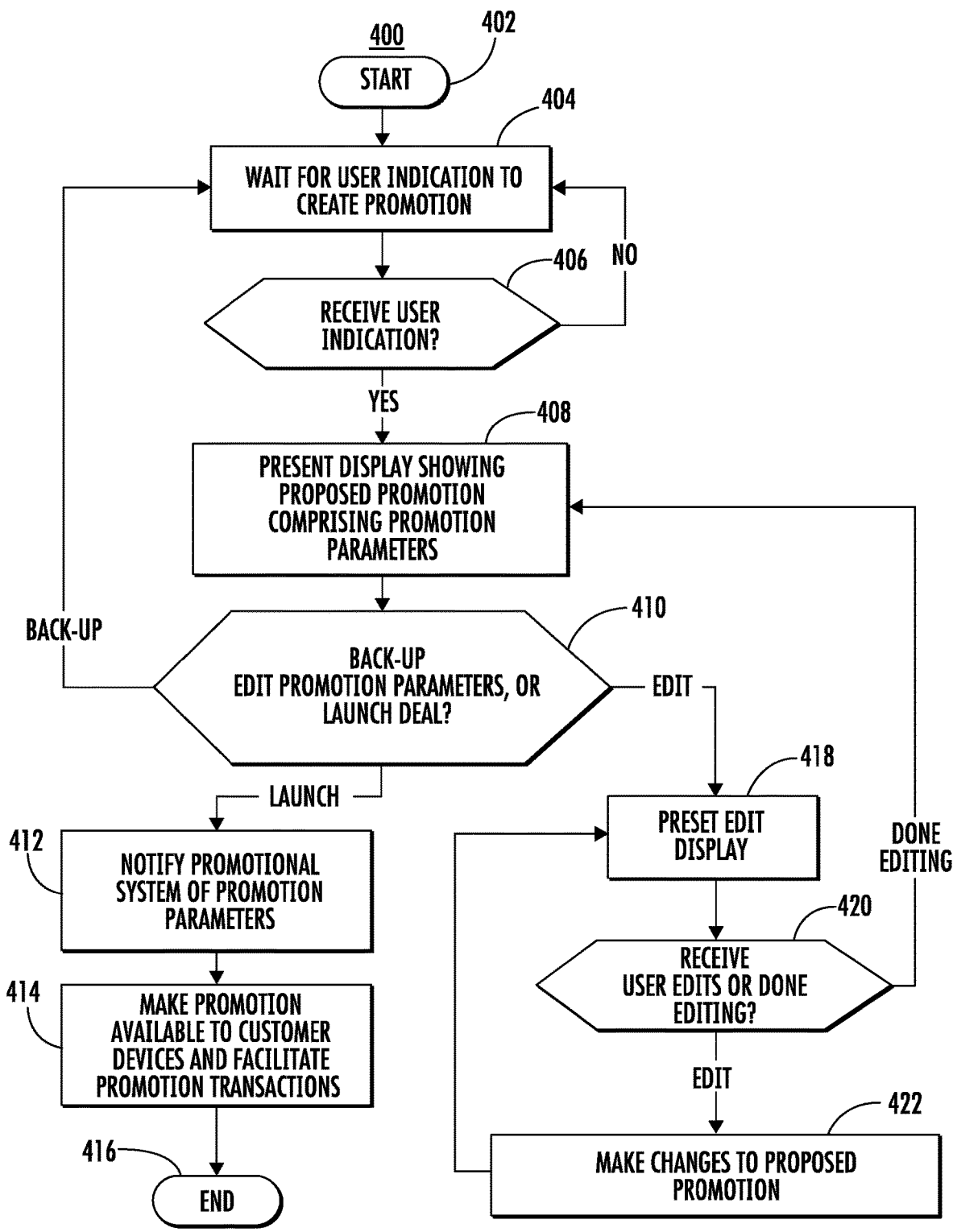
FIGS. 4-6 illustrate flow charts detailing exemplary processes of programmatically generating and editing a promotion in accordance with some embodiments discussed herein.

FIG. 4 shows an example method, namely process 400, that may be executed by one or more machines (some examples of which are discussed in connection with FIGS. 8 and 9) to provide the displays of FIGS. 1-3, among others, in accordance with some embodiments discussed herein. Process 400 starts at 402 and waits for a user's indication to create a promotion at 404. In one example, display 100 of FIG. 1 is shown as including button 102 that may be displayed by a touch-sensitive display screen of a device, such as a provider device (such as those discussed below in connection with FIGS. 8 and 9). At 404, process 400 may wait for, e.g., button 102 of display 100 to be selected, and determine at 406 whether or not a user indication of the selection of, e.g., button 102, has been received by a processor of the provider device.

Display 100 may include other display elements in addition to or instead of button 102. For example, map portion 104 may be included in display 100, which may show the location of the provider device and/or brick-and-mortar retail store of the provider relative to potential consumers within a predetermined geographic region of the provider device and/or retail store.

Although the displays of FIGS. 1-3 are shown as being optimized for a touch-sensitive device, the functionality discussed in connection with the displays of FIGS. 1-3 may be provided by one or more machines having any suitable display screen in accordance with embodiments discussed herein. For example, the display may be provided by a machine that has a non-touch-sensitive display and a mouse and/or other input component (such as, e.g., a touch pad).

Returning to process 400 of FIG. 4, in response to determining at 406 that a user indication to create a promotion has been received (e.g., button 102 has been pressed or otherwise selected), process 400 proceeds to 408 and presents a display showing a proposed promotion comprising promotion parameters. In one example, the proposed promotion parameters can be programmatically generated based on the output(s) of one or more promotion creation algorithms, such as those discussed in greater detail herein or, for example, those discussed in connection with FIG. 5.

FIG. 2 illustrates an example display 200 of an interface that may be presented at 408 and shows an example proposed promotion including programmatically generating promotion parameters. As referred to herein, "programmatically generated" refers to one or more machines executing one or more algorithms to generate one or more outputs based on one or more inputs. The proposed promotion parameters can be presented in portion 202 of display 200. For example, the proposed promotion parameters can include, the promotion amount (e.g., $20 coupon for $10, which can indicate the promotion value ($20), the promotion cost ($10), and the discount (50%)), promotion limitations (e.g., food and drink only, food only, non-alcoholic purchases, etc.), a suggested start time (e.g., valid starting Mondays), end time (e.g., valid until Fridays, valid until 5:00 pm everyday), or timing period during which the promotion can be redeemed by a consumer (e.g., Wednesdays between 10:00 am and 2:00 pm, any time, only during happy hour, etc.), redeemable locations (e.g., the store on $5^{th}$ street but not the store on $6^{th}$ street all store locations, online only, etc.), a maximum and/or minimum number of promotions that may be sold during a given period of time (e.g., 15 promotions per day), among other things. Portion 204 of display 200 may include a picture, graphics, text descriptions, and/or other advertising/marketing related communications for viewing by a consumer. In this regard, some embodiments of display 200 may also function as a preview display of what consumers will see once the promotion is offered to consumers publically.

In response to determining at 410 that the provider has indicated a desire to go backwards in process 400 (e.g., in response to determining there was a selection of back now option 206 and, thus, a need to go back one or more steps), display 100 of FIG. 1 may be displayed again at 404 of FIG. 4. Although backwards navigation is only mentioned in connection with decision 410 for simplicity and ease of explanation, backwards navigation may or may not be provided in more or less displays than what is discussed herein. In this regard, other functionality discussed herein can be combined, rearranged, added, subtracted, and/or otherwise modified without departing from the inventive concepts herein described.

In response to determining at 410 that the provider would like to launch a promotion based on the programmatically generated promotion offer parameters (e.g., in response to determining there was a selection of launch option 208), a promotion in accordance with the promotion parameters shown in display 200 can be launched by the system. In this regard, launch option 208 can greatly improve the provider's user experience by providing a simple, one-button promotion creation option. As such, some embodiments discussed herein can be configured to provide proposed promotion parameters customized to the particular provider (based on, e.g., the algorithm discussed in connection with FIG. 5), thereby making it relatively easy for the provider to publish a promotion and advertise goods, such as goods that may expire in the near future.

At 412, the provider device can be configured to communicate the promotion parameters approved by the provider to a remote device, such as the promotional system (examples of which are discussed below), that may be configured to facilitate the providing of promotions to consumers. The promotional system can include, for example, one or more network servers, databases, and/or any other suitable machines configured to communicate with the provider device and/or consumer devices.

The promotional system can be configured to make the promotion available to consumers at 414. For example, the promotional system can be configured to compile the promotion into one or more different formats, market the promotion to consumers in those formats (e.g., email, push notifications, and/or otherwise present the promotion to consumers), receive and process payment from the consumers for the promotion, enable one or more systems to facilitate the redemption of the promotion, facilitate payment to the provider for the promotion, and/or perform any other functionality that may assist in facilitating the creation, marketing, selling, monitoring and archival of promotion-related data. At 416, process 400 ends.

Returning to the decision at 410 of process 400, in response to determining that the provider wants to edit the programmatically generated promotion parameters (e.g., in response to determining there was a selection of edit option 210), an editing interface can be displayed at 418. For example, at 418, the provider device can be configured to present display 300 of FIG. 3.

Display 300 may include one or more user-interactive display elements (e.g., one or more of the other displays presented by the provider device). For example, slide bar 302 can be used by a provider to configure the promotion value. In some embodiments, the programmatically generated promotion value parameter and/or any other promotion parameters included in display 300 (which may have also been included in display 200 of FIG. 2 at 408 of process 400) can be presented as a default starting point at 418. In other embodiments, the starting point for editing the promotion value and/or other promotion parameters shown in display 300 may be derived from, for example, user-entered preferences, past promotion information, and/or any other type of promotion-related data. Options 304 can be used to configure promotion parameters relating to the times of day during which the promotion may be redeemed by a consumer (e.g., start time and end time). Similarly, options 306 may be used to configure promotion parameters relating to the days during which the promotion may be redeemed by a consumer (e.g., particular days of the week, weekdays, weekends, etc.). In some embodiments, additional or alternative promotion parameters may be configured. For example, the provider may be able to scroll down in the direction of motion arrow 308 to reveal more promotion parameters that a provider may optionally edit.

At 420, the processor of the provider device may monitor for provider inputs (e.g., the selection and/or manipulation of one or more options presented in display 300). As indications of provider inputs are received (e.g., data generated by an input/output component of the provider device), changes may be made at 422 to the proposed promotion by modifying or otherwise editing the promotion parameters, and the process may return to 418 to show an updated version of the display with the changes made. For example, as the provider slides a finger over the slide bar 302 to increase the promotion value, the input can be received at 420, changes to the promotion value parameter can be made at 422, and the updated promotion value parameter can be displayed at 418.

In response to determining the provider has finished making edits (e.g., receiving an indication of the provider selecting done button 310, the process timing-out, among other things), process 400 can return to 408 and present a display showing the modified promotion parameters. The display presented at 408 may be similar to or the same as that shown in FIG. 2, but may include any edits or changes made in accordance with user changes that were received at 420 and implemented at 422.

Figure 5:
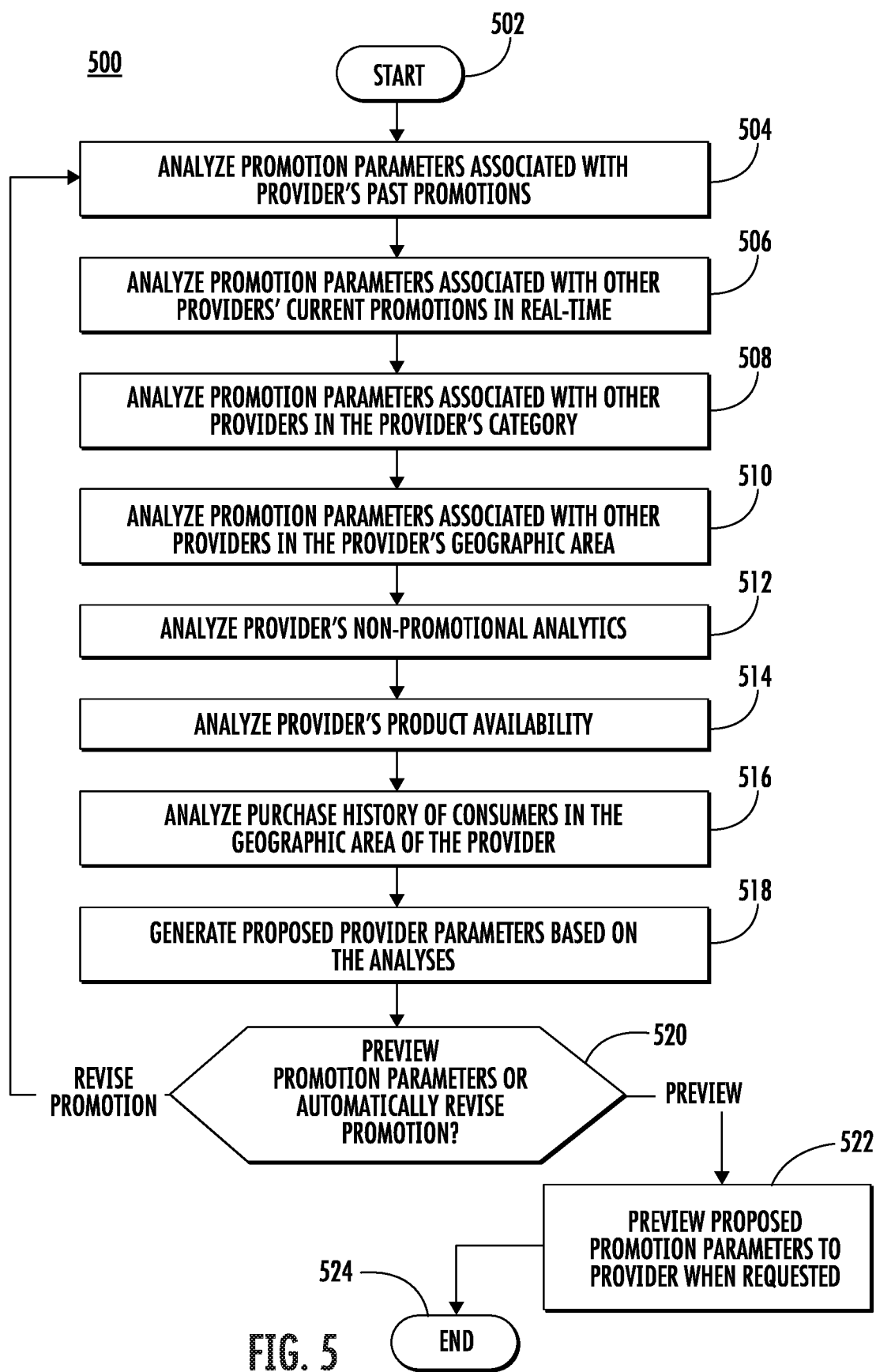

FIG. 5 shows process 500, which is an example of an algorithm that may be used to automatically generate programmatically proposed promotion offer parameters presented by, e.g., display 200 of FIG. 2. In some embodiments, the promotion parameters may be presented or otherwise previewed to the provider in a display (such as display 200) each time the parameters are outputted by process 500. In other embodiments, the promotion parameters may not be presented or otherwise previewed to the provider in a display (such as display 200) each time the parameters are outputted by process 500. For example, the provider may opt-in to an automated and/or remotely-controlled promotional campaign offered by a promotion and marketing service that is based at least in part on process 500. As such, process 500 may be executed based on initial criteria supplied by the provider to one or more promotional systems (such as those operated by Groupon, Inc. of Chicago, Ill.) absent the provider's continued involvement and/or in conjunction with the provider's continued involvement. Process 500 starts at 502.

At 504, a system, such as one or more processors of a promotional system, can be configured to analyze promotion parameters associated with the provider's past promotion offerings. For example, times of day, quantities of instruments sold, oversell of the instruments, and/or any other data associated with an instrument's sale, or lack thereof, can be analyzed at 504. Each of the past promotion's parameters can be assigned a weighted value based upon trends that are determined in connection with the success (i.e., successfulness) and/or lack of success (i.e., unsuccessfulness) of the promotions for that particular provider.

At 506, the processor can be configured to analyze promotion parameters associated with the provider's current promotion offerings. The current promotion offerings relative successfulness or unsuccessfulness may enable the system to determine the trajectory of a trend. For example, process 500 can be configured to determine and adjust a lunchtime promotion that was determined at 504 to be historically successful on Wednesdays from 12:30-2:00, after it is determined at 506 that this promotion is not selling as well this current Wednesday (e.g., because a competitor has started offering an early bird special starting at 11:00 am on Wednesdays). How well a promotion is selling can be determined based on, e.g., the number of promotions sold at a time within the range of availability (e.g., at 1:00 pm when the range of availability is 12:30-2:00 pm). In this regard, any current promotion parameters can be assigned a weighted value based upon trends that are determined in connection with the successfulness and/or unsuccessfulness of the promotions for that particular provider.

At 508, the processor can be configured to analyze promotion parameters associated with other providers in the provider's category. For example, the promotional system can promote a plurality of providers that are categorized together by the promotional system. For example, the promotional system may offer promotions and/or otherwise promote businesses that provide spa treatments. Each of these businesses can be categorized by the promotional system as a spa. As another example, businesses that serve food and drink after payment is received can be categorized as a "Deli/Coffee Shop" by the promotional system. In some embodiments, there may be broader categories and/or sub-categories. For example, a "Spa" category may include a subcategory for a "Facial Specialist," and itself may be a subcategory for the broader "Health and Beauty" category. As another example, a "Deli/Coffee Shop" category may be a subcategory of a "Restaurants" category, which may itself be a subcategory of a "Food and Drink" category. Promotion parameters for each category/subcategory of providers can be assigned a value related to how successful or unsuccessful they are (e.g., how well they sell and how much profit they make the respective provider), and can be used in determining proposed parameters for the provider benefiting from process 500.

At 510, the processor can be configured to analyze promotion parameters associated with other providers in the provider's geographic area. For example, certain neighborhoods may attract people willing to spend more money than other neighborhoods. The promotional system can be configured to take into consideration the provider's neighborhood when determining proposed promotion parameters. Additional examples of providing real-time promotion offers within a provider's vicinity are discussed in previously-incorporated, commonly-assigned U.S. Patent Application Publication No. 2011/0313840, filed Mar. 17, 2011, titled "SYSTEM AND METHODS FOR PROVIDING LOCATION BASED DISCOUNT RETAILING."

At 512, the processor can be configured to analyze non-promotion analytics associated with the provider's past promotion offerings. For example, the provider's point-of-sale device can be configured to report some or all of the sales information (e.g., dollar amount received, time of day, profitability, etc.) to the promotional system, regardless of whether the sales information is related to a promotion. The non-promotion analytics can then be analyzed by the promotional system to determine how busy the provider is currently, when the provider's busiest/slowest times are historically, when the provider's most/least profitable times are historically, and/or any other sales-related information.

At 514, the processor can be configured to analyze the provider's available product inventory or service availability (e.g., how many open tables at a restaurant, how many open appointments, etc.). Similarly, the processor can be configured to analyze the provider's calendar and/or any other type of scheduler that is used to help the provider keep track of inventory and/or service availability and, thus, determine when a provider may be more likely to benefit from a promotion being offered.

At 516, consumer transactions that are reported to the promotional system can also be weighed in the algorithm of process 500 for generating proposed promotion parameters. For example, the promotional system can be configured to determine for which prices and on what types of goods consumers are purchasing in a geographic area of the provider (e.g., within one block, one mile, five miles, ten miles, and/or any other selected distance from the provider). As such, in response to the promotional system determining that consumers are purchasing umbrellas at a higher rate than historical norms (i.e., suggesting that it may be raining within a target region), discounts on taxicabs (which may encounter higher demand during rain periods) can be reduced or paused programmatically in response to a central promotional system determining a promotion offer should be paused in the absence of receiving a provider request to do so. As another example, in response to determining that consumers are purchasing golf clubs in a club house of a local golf club, promotion parameters may be generated for a practice round at the golf club whereby such newly purchased clubs may be used.

At 518, proposed promotion parameters (such as those shown in FIG. 2) can be generated based on the results of the analyses of 504-516. In some embodiments, additional and/or different analyses may be included in process 500. Further, some embodiments can skip to 518 after performing fewer steps and/or after performing each of 504-516. As such, process 500 can generate proposed promotion parameters based on various analytics related to the provider's sales information, other provider's sales information and/or consumer's purchasing information.

A determination can be made at 520 whether or not the proposed promotion parameters should be previewed to the provider for approval before being used to generate a new promotion offer. For example, in some embodiments, a provider may configure the promotional system to conduct a promotional campaign that updates automatically without the provider's input based upon, for example, the analyses discussed in connection with 504-516. In such instances, the proposed promotion parameters can be used by the promotional system to programmatically revise the promotion offer and process 500 returns to 504 to continue analyzing the various data use to configure the promotion.

In response to determining at 520 that the proposed promotion parameters are to be previewed to the provider before being used to revise and/or otherwise generate a promotion offer, process 500 may proceed to 522 and display the proposed promotion parameters for the provider's approval. For example, display 200 may be presented at 522 when requested. Process 500 ends at 524.

Figure 6:
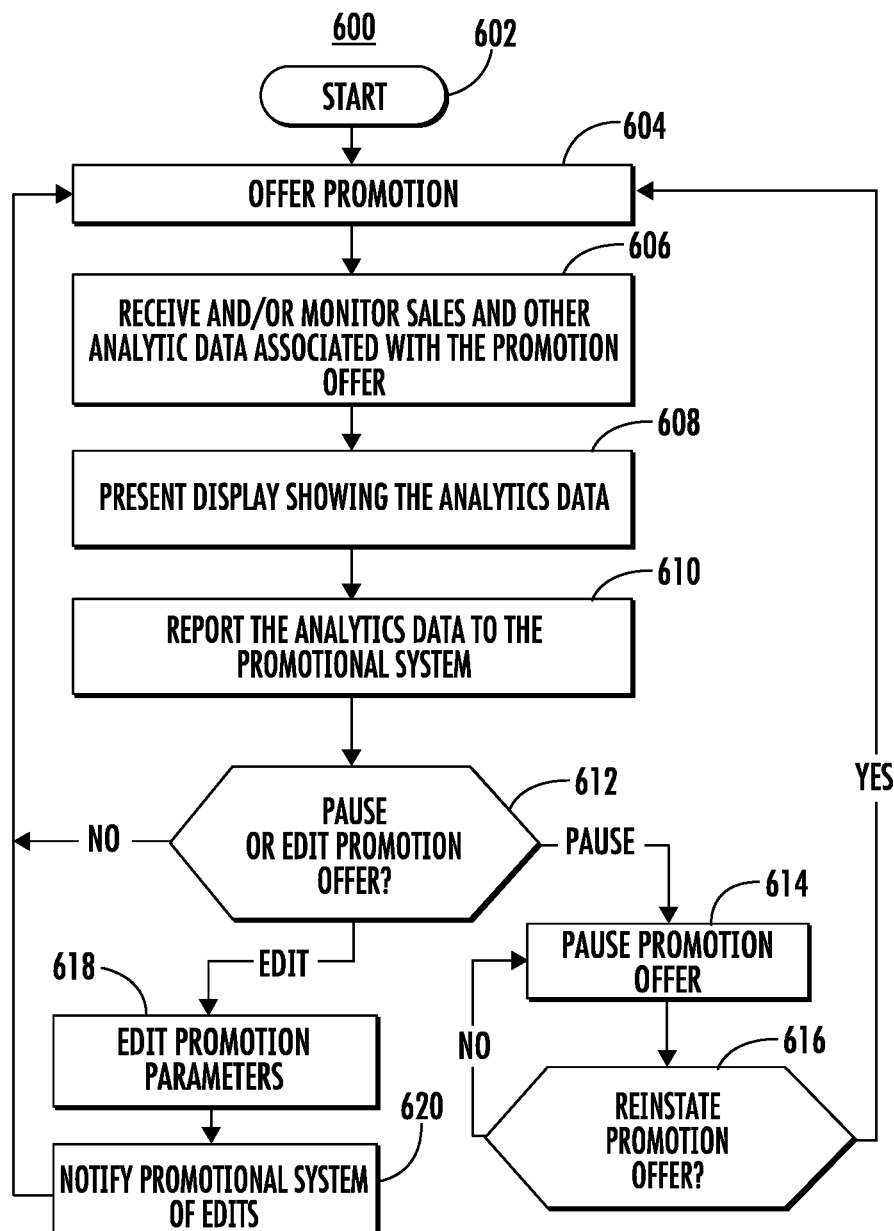
Figure 7:
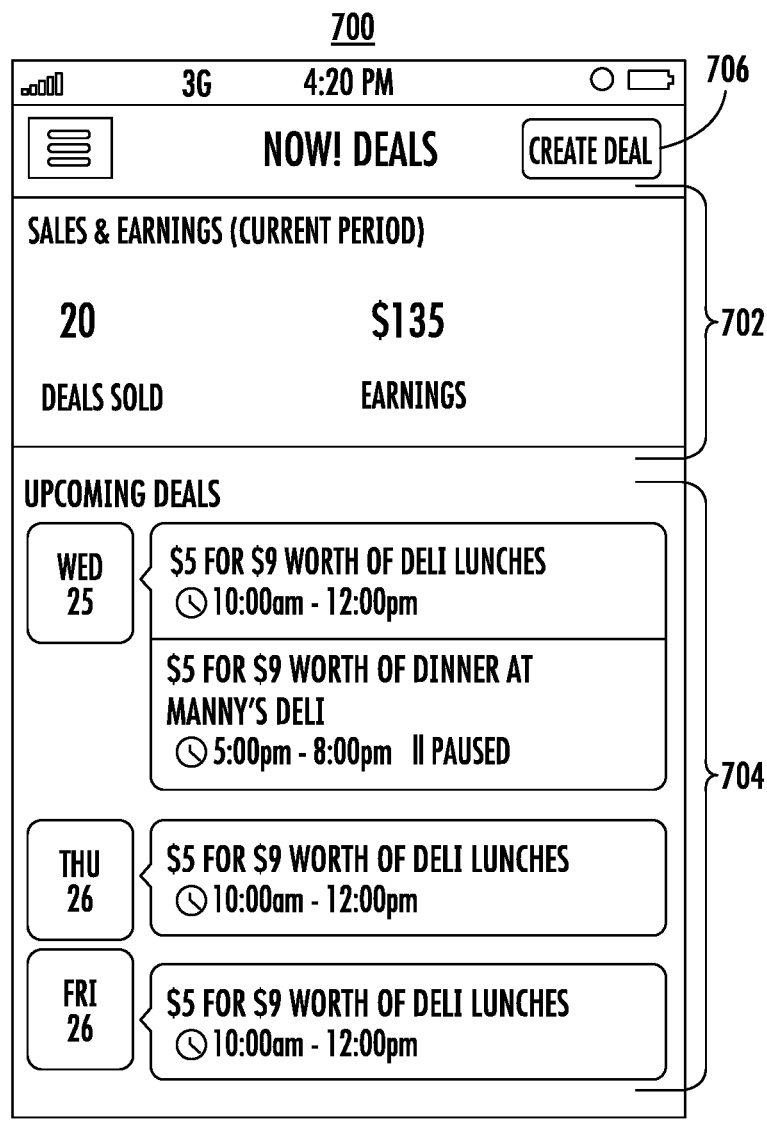
FIG. 7 illustrates an example graphical user interface display that may be presented by various components of systems in accordance with some embodiments discussed herein.

FIG. 6 shows process 600, which is an example of an algorithm that may be used to monitor promotion analytics that can be subsequently processed to provide new promotion offers and/or a revised promotion offer (e.g., in accordance with process 500) and/or presented in a display, such as display 700 of FIG. 7. Process 600 starts at 602.

At 604, a promotion is offered such that the promotion is active. For example, the promotional system publishes an advertisement on a website, sends an email, pushes a notification and/or otherwise notifies one or more potential consumers that a promotion is being offered. In some embodiments, prior to a promotion being activated, a provider may have provided an indication corresponding to an approval of promotion parameters. Further, a currently active promotion may cause a promotional system to publish an advertisement on a website, send an email, transmit a notification, and/or otherwise notify one or more potential consumers of the active promotion currently being offered. In some embodiments, a currently active promotion may provide an impression to one or more consumers that may allow a consumer to purchase an instrument that embodies the terms of the promotion and/or one or more redemption parameters. In some embodiments, a currently active promotion may also provide a plurality of instruments that are configured to be currently redeemed by a provider.

At 606, the promotional system and/or the provider system can be configured to receive and/or monitor sales and/or other analytics data associated with the promotion offer. For example, at 606, the promotional system can be configured to keep track how many promotions have sold, the promotion value, the discount value, how quickly the promotions sold, where the promotions are sold, what other promotions were bought by the same or similar consumers, and/or any other data that may be analyzed by, e.g., process 500.

At 608, a display can be presented showing the analytics data. For example, a provider device can be configured to present display 700 of FIG. 7, which includes analytics portion 702, including the number of promotions sold and the amount of money earned from the sale of those promotions. In some embodiments, the information presented in analytics portion 702 can be related to a current period during which a promotion is currently running in real-time. (As referred to herein, real-time includes near-real time and/or any other time in which the data is being updated as transactions occur and/or are registered with the system.) Display 700 may also include future promotions portion 704, which may show promotion parameters (including, e.g., date, promotion value, purchase value, redemption time window, among other things) for currently scheduled upcoming promotions. The upcoming promotions may have been generated programmatically (e.g., in accordance with process 500), manually by the provider, manually by a promotional system user (e.g., during a teleconference with a provider), and/or by any other suitable manner. Create promotion option 706 can be configured to function similar to button 102.

Returning to FIG. 6, at 610, the analytics data can be transmitted to the promotional system, which can in turn be configured to save and/or analyze the data. For example, the data can be saved in a database with promotion parameter data and/or processed to crate promotion parameter data.

At 612, a provider may indicate a desire to pause and/or edit a promotion offer. For example, in response to selecting analytics portion 702 of display 700, the system can be configured to provide an overlay (or other type of display) giving the provider the option to pause and/or edit the promotion offer. In some embodiments, rather than or in addition to providing the option to the provider, pausing or editing the promotion offer may be a default response to the provider touching analytics portion 702. At 612, the provider may also or instead indicate a desire to pause and/or edit an upcoming promotion offer by selecting an upcoming promotion offer included in future promotions portion 704.

In some embodiments, the determination at 612 can be performed automatically and without the provider's direct involvement (e.g., in the absence of the provider touching a button provided by a provider device). For example, in response to the system programmatically determining that a promotion offer is not selling at a rate that was expected (e.g., at least 5 per hour) or is selling at rate that is too high (e.g., 50 per minute), determining that an error may be occurring, determining that the promotion offer is too generous, determining that the promotion offer is not generous enough, and/or determining that any other issue may be occurring, the system can pause the promotion offer (e.g., remove it from the stream of commerce) and/or programmatically edit the promotion offer (or present options to the provider for editing the same) to assist the provider (e.g., increase the discount amount, decrease the discount amount, shorten the available time window, and/or perform any other function to the promotion offer).

In response to determining at 612 that a promotion offer (future and/or current) is to be paused, the promotional system can be configured to pause the promotion offer at 614. For example, in response to determining a provider indication to pause a future promotion offer, the provider device can be configured to generate and transmit a pause signal associated with the future promotion to the promotional system. In some embodiments, when the promotional system programmatically determines that a promotion offer should be paused, the promotional system can be configured to send the provider device a notification and/or other message indicating that the provider's promotion has been paused. Additionally and/or alternatively, when any other automatic function (e.g., promotion offer editing, reinstating, etc.) is performed by the promotional system, the promotional system can be configured to send the provider device a corresponding notification.

At 616, a determination can be made as to whether the promotion offer should be reinstated. If not, the process returns to 614. If a determination is made to reinstate the promotion offer, the process returns to 604.

In response to determining at 612 that a promotion offer (future and/or current) is to be edited by a provider (as opposed to or in addition to programmatically), the promotional system can be configured to provide the provider an editing display, such as display 300 of FIG. 3. At 620, the promotional system can be notified of the edits and process 600 can proceed to 604. Similarly, process 600 can proceed to 604 in response to determining at 612 the promotion is not to be paused or edited and is to continue functioning as configured.

Figure 8:
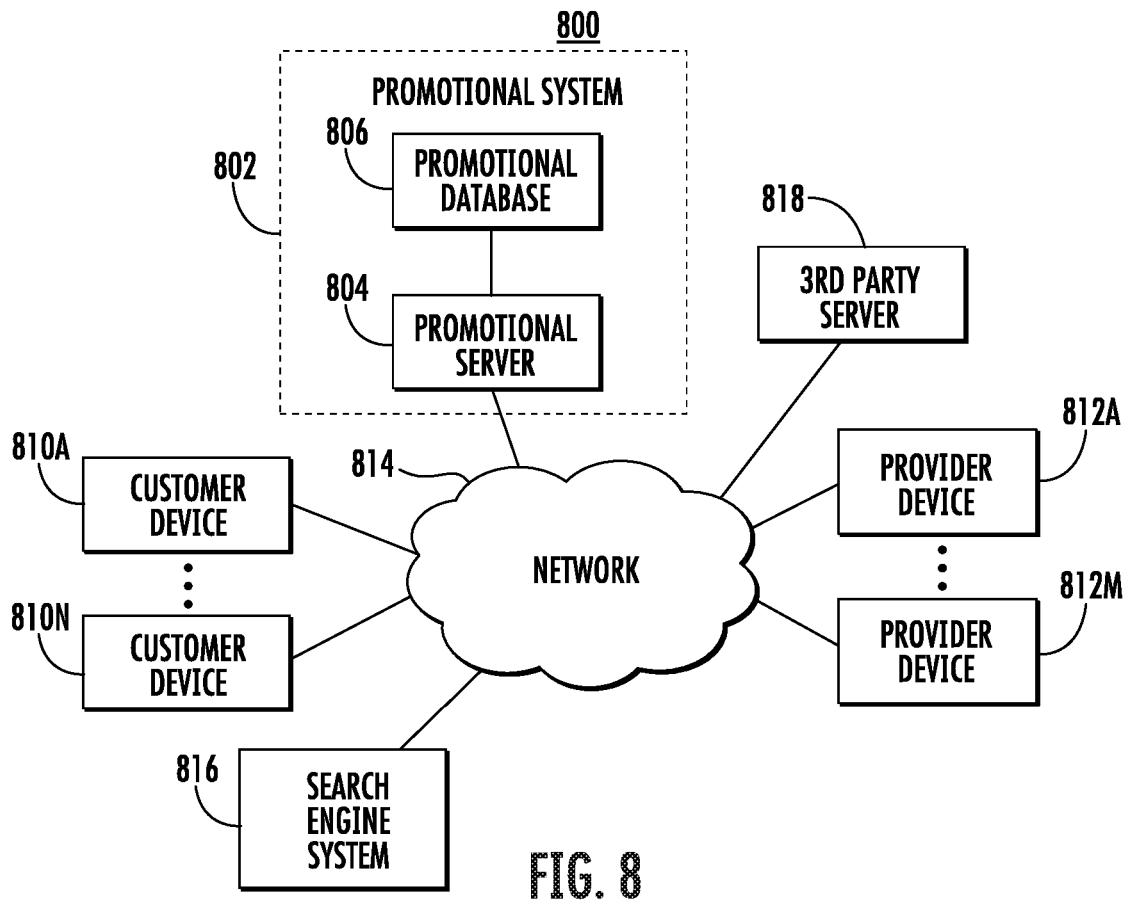
FIG. 8 illustrates an example system in accordance with some embodiments discussed herein.

FIG. 8 shows system 800 including an example network architecture for a retailing system, which may include one or more devices and sub-systems that are configured to implement some embodiments discussed herein. For example, system 800 may include promotional system 802, which can include, for example, promotional server 804 and promotional database 806, among other things (not shown). Promotional server 804 can be any suitable network server and/or other type of processing device. Promotional database 806 can be any suitable network database configured to store promotion parameter data and/or analytics data, such as that discussed herein. In this regard, system 802 may include, for example, at least one backend data server, network database, cloud computing device, among other things.

Promotional system 802 can be coupled to one or more consumer devices 810A-810N and/or one or more provider devices 812A-812N via network 814. In this regard, network 814 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 814 may include a cellular telephone, an 802.11, 802.16, 802.20, and/or WiMax network. Further, the network 814 may include a public network, such as the Internet, a private network, such as an intranet, or combinations thereof, and may utilize a variety of networking protocols now available or later developed including, but not limited to TCP/IP based networking protocols.

Consumer devices 810A-810N and/or provider devices 812A-812M may each be implemented as a personal computer and/or other networked device, such as a cellular phone, tablet computer, mobile device, etc., that may be used for any suitable purpose in addition to buying promotions and/or offering promotions for sale. The depiction in FIG. 8 of "N" consumers and "M" providers is merely for illustration purposes. In one embodiment, the consumer devices 810A-810N may be configured to display an interface on a display of the consumer device for viewing at least one impression of a promotion, which may be provided by the promotional system. According to some embodiments, the provider devices 812A-812M may be configured to display an interface on a display of the provider device for viewing, creating, editing, and/or otherwise interacting with a promotion. In some embodiments, an interface of a consumer device 810A-810N may be different from an interface of a provider device 812A-812M. System 800 may also include at least one search engine system 816 and/or 3rd party server 818, among other things.

Figure 9:
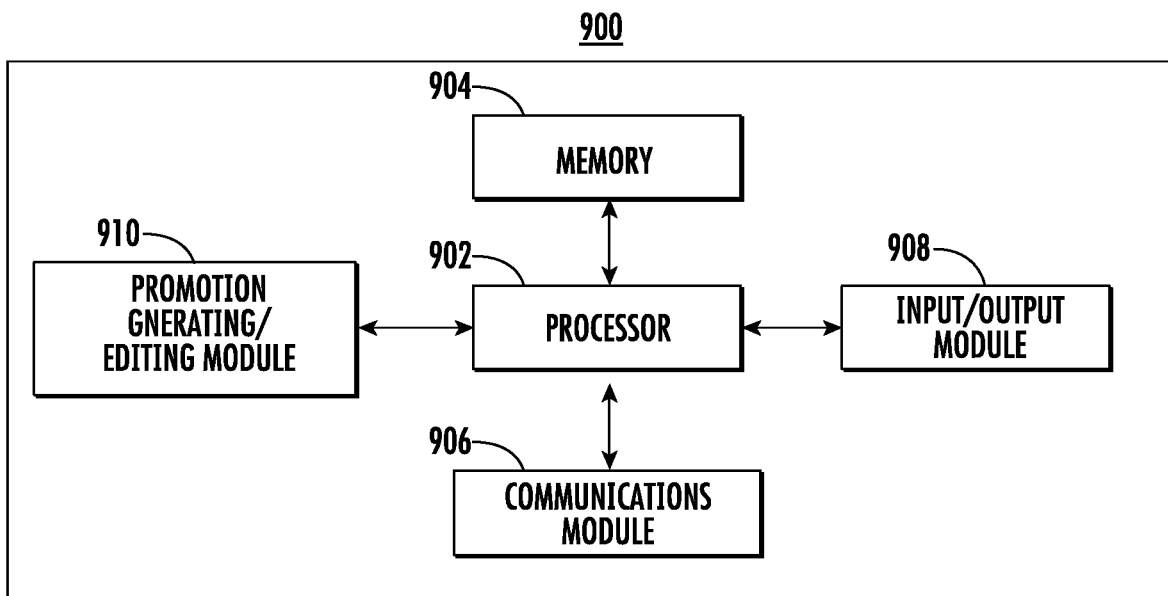
FIG. 9 illustrates a schematic block diagram of circuitry that can be included in a computing device, such as a provider machine, consumer machine and/or promotional system, in accordance with some embodiments discussed herein.

FIG. 9 shows a schematic block diagram of circuitry 900, some or all of which may be included in, for example, promotional system 802, consumer devices 810A-810N and/or provider devices 812A-812N. As illustrated in FIG. 9, in accordance with some example embodiments, circuitry 900 can includes various means, such as processor 902, memory 904, communications module 906, and/or input/output module 908. In some embodiments, such as when circuitry 900 is included in provider devices 812A-812N and/or promotional system 802, promotion generating/editing module 910 may also or instead be included. As referred to herein, "module" includes hardware, software and/or firmware configured to perform one or more particular functions. In this regard, the means of circuitry 900 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 904) that is executable by a suitably configured processing device (e.g., processor 902), or some combination thereof.

Processor 902 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 9 as a single processor, in some embodiments processor 902 comprises a plurality of processors. The plurality of processors may be embodied on a single computing device or may be distributed across a plurality of computing devices collectively configured to function as circuitry 900. The plurality of processors may be in operative communication with each other and may be collectively configured to perform one or more functionalities of circuitry 900 as described herein. In an example embodiment, processor 902 is configured to execute instructions stored in memory 904 or otherwise accessible to processor 902. These instructions, when executed by processor 902, may cause circuitry 900 to perform one or more of the functionalities of circuitry 900 as described herein.

Whether configured by hardware, firmware/software methods, or by a combination thereof, processor 902 may comprise an entity capable of performing operations according to embodiments of the present invention while configured accordingly. Thus, for example, when processor 902 is embodied as an ASIC, FPGA or the like, processor 902 may comprise specifically configured hardware for conducting one or more operations described herein. Alternatively, as another example, when processor 902 is embodied as an executor of instructions, such as may be stored in memory 904, the instructions may specifically configure processor 902 to perform one or more algorithms and operations described herein, such as those discussed in connection with FIGS. 4-6.

Memory 904 may comprise, for example, volatile memory, non-volatile memory, or some combination thereof. Although illustrated in FIG. 9 as a single memory, memory 904 may comprise a plurality of memory components. The plurality of memory components may be embodied on a single computing device or distributed across a plurality of computing devices. In various embodiments, memory 904 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 904 may be configured to store information, data (including promotion parameter data and/or analytics data), applications, instructions, or the like for enabling circuitry 900 to carry out various functions in accordance with example embodiments of the present invention. For example, in at least some embodiments, memory 904 is configured to buffer input data for processing by processor 902. Additionally or alternatively, in at least some embodiments, memory 904 is configured to store program instructions for execution by processor 902. Memory 904 may store information in the form of static and/or dynamic information. This stored information may be stored and/or used by circuitry 900 during the course of performing its functionalities.

Communications module 906 may be embodied as any device or means embodied in circuitry, hardware, a computer program product comprising computer readable program instructions stored on a computer readable medium (e.g., memory 904) and executed by a processing device (e.g., processor 902), or a combination thereof that is configured to receive and/or transmit data from/to another device, such as, for example, a second circuitry 900 and/or the like. In some embodiments, communications module 906 (like other components discussed herein) can be at least partially embodied as or otherwise controlled by processor 902. In this regard, communications module 906 may be in communication with processor 902, such as via a bus. Communications module 906 may include, for example, an antenna, a transmitter, a receiver, a transceiver, network interface card and/or supporting hardware and/or firmware/software for enabling communications with another computing device. Communications module 906 may be configured to receive and/or transmit any data that may be stored by memory 904 using any protocol that may be used for communications between computing devices. Communications module 906 may additionally or alternatively be in communication with the memory 904, input/output module 908 and/or any other component of circuitry 900, such as via a bus.

Input/output module 908 may be in communication with processor 902 to receive an indication of a user input and/or to provide an audible, visual, mechanical, or other output to a user (e.g., provider and/or consumer). Some example visual outputs that may be provided to a user by circuitry 900 are discussed in connection with FIGS. 1-3 and 7. As such, input/output module 908 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 900 is embodied as a server or database, aspects of input/output module 908 may be reduced as compared to embodiments where circuitry 900 is implemented as an end-user machine (e.g., consumer device and/or provider device) or other type of device designed for complex user interactions. In some embodiments (like other components discussed herein), input/output module 908 may even be eliminated from circuitry 900. Alternatively, such as in embodiments wherein circuitry 900 is embodied as a server or database, at least some aspects of input/output module 908 may be embodied on an apparatus used by a user that is in communication with circuitry 900, such as for example, pharmacy terminal 108. Input/output module 908 may be in communication with the memory 904, communications module 906, and/or any other component(s), such as via a bus. Although more than one input/output module and/or other component can be included in circuitry 900, only one is shown in FIG. 5 to avoid overcomplicating the drawing (like the other components discussed herein).

Promotion generating/editing module 910 may also or instead be included and configured to perform the functionality discussed herein related to generating and/or editing promotion offers discussed above. In some embodiments, some or all of the functionality of generating and/or editing promotion offers may be performed by processor 902. In this regard, the example processes and algorithms discussed herein can be performed by at least one processor 902 and/or promotion generating/editing module 910. For example, non-transitory computer readable media can be configured to store firmware, one or more application programs, and/or other software, which include instructions and other computer-readable program code portions that can be executed to control each processor (e.g., processor 902 and/or promotion generating/editing module 910) of the components of system 800 to implement various operations, including the examples shown above. As such, a series of computer-readable program code portions are embodied in one or more computer program goods and can be used, with a computing device, server, and/or other programmable apparatus, to produce machine-implemented processes.

For example, promotion generating/editing module 910 can be configured to analyze multiple potential promotion offers (e.g., including various combinations of days, times, goods, durations, etc.) in view of known provider needs (such as, e.g., needing to sell excess inventory, underutilized service appointments, and/or inventory about to expire) to recommend one (or a list) of potential promotion offers to present to a provider device. In this way, promotion generating/editing module 910 may support multiple ranking algorithms, such as those discussed above, so that the selected algorithm may be chosen at runtime. Further, the present configuration can enable flexibility in terms of configuring additional contexts.

In some embodiments, promotion generating/editing module 910 iteratively scores potential promotion offers and/or ranks a list of the potential promotion offers. The promotional system 802 may be configured to view one or more of the top potential promotion offers, and the respective provider device may be configured to display only the top potential promotion offer. In some embodiments, the promotional system may likewise display only one or no potential promotion offers and the provider device may display none or a plurality of promotion offers. Promotion generating/editing module 910 can be configured to access multiple promotion offers, and generate initial scores for the multiple promotion offers and/or an initial ranking of the multiple promotion offers. In some embodiments, the multiple promotion offers can be ranked in accordance with a promotional campaign strategy, wherein multiple promotions are prescheduled and coordinated for the future. Thereafter, promotion generating/editing module 910 can adjust the initial scores for the multiple promotions and/or the initial ranking of the multiple promotions at least once (and potentially multiple times). Promotion generating/editing module 910 may adjust the scores and/or the rankings of the promotions in one or multiple ways. For example, the promotion generating/editing module 910 may use one or more correction factors in order to alter the initial scores or subsequent scores for the multiple promotions and/or the initial ranking of the multiple promotions or subsequent ranking(s) of the multiple promotions. As another example, the promotion generating/editing module 910 may use one or more rules to adjust the initial scores, the subsequent scores, the initial ranking of the multiple promotion offers, or the subsequent ranking(s) of the multiple promotion offers (such as by excluding a promotion based on a business rule).

In adjusting the initial scores, the subsequent scores, the initial ranking and/or the subsequent ranking(s), the promotion generating/editing module 910 may analyze consumer data, provider data and/or promotion data. For example, the promotion generating/editing module 910 may analyze provider data during one scoring or one ranking of the multiple promotion offers and analyze provider data (or a different type of provider data) during a subsequent scoring or a subsequent ranking. For example, a plurality of promotions can be preconfigured over the course of days, weeks and/or some other time frame, wherein only one or a few variables (such as time, price, etc.) changes, and the other promotion variables remain the same as a control. This may help promotion generating/editing module 910 to conduct market research and/or otherwise determine what the best promotion offer is for a particular provider. The provider device may or may not include a user-configurable authorization feature to enable this and/or other features discussed herein.

The provider data analyzed by the promotion generating/ editing module 910 may be the same type of provider data in the different scoring or ranking iterations. For example, the promotion generating/editing module 910 may analyze a first type of geographic data in order to generate scoring for the multiple promotion offers or one ranking of the multiple promotion offers, and may analyze a second type of geographic data in order to generate subsequent scoring or a subsequent ranking. In particular, the promotion generating/ editing module 910 may use distance of the consumer(s) to a promotion location to generate the initial scores for the multiple promotion offers and/or an ranking(s) of the multiple promotion offers, and use the location of the consumer (s) in a city to determine whether to modify the initial scores and/or to adjust the initial ranking of the multiple promotions.

Alternatively and/or additionally, the promotion generating/editing module 910 may analyze different types of user data in the different scoring or ranking iterations. For example, the promotion generating/editing module 910 may analyze consumer and/or provider data that does not include user past purchase history to generate scoring for the multiple promotions and/or one ranking of the multiple promotions, and may analyze consumer and/or provider past purchase/sale history to generate subsequent scoring or a subsequent ranking (such as using past purchase history to modify the scores or to adjust an initial ranking of the promotion offers). As another example, the promotion generating/editing module 910 may analyze provider and/or consumer data that does not include provider and/or consumer promotion type preference(s) to generate scores for the multiple promotions or one ranking of the multiple promotions, and may analyze provider and/or consumer promotion type preference(s) to generate subsequent scoring or a subsequent ranking. As still another example, the promotion generating/editing module 910 may analyze provider and/or consumer data that does not include any aspect of the consumer interest to generate scores for the multiple promotions or one ranking of the multiple promotions, and may analyze consumer interest (such a user's open rate of previous e-mails and/or a consumer's click rate of links) to generate subsequent scoring or a subsequent ranking.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 800. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 902 and/or promotion generating/editing module 910 discussed above with reference to FIG. 9, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 904) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising a processor and one or more non-transitory storage devices embodying computer-readable program instructions that, when executed by the processor, cause the system to:
    output, to a provider device associated with a provider located at a fixed location, a real-time promotion generation interface;
    receive, via a network, a real-time promotion creation indication associated with the real-time promotion generation interface, wherein the real-time promotion creation indication includes a request to create a first promotion in real-time for a first subset of potential customers within a provider geographic area immediately proximate the fixed location, wherein the first promotion is immediately available for a limited time duration and is redeemable for a limited timing period;
    determine, via the processor, that the first subset of potential customers is within the provider geographic area, wherein determining that the first subset of potential customers is within the provider geographic area comprises:
        receiving, via the network, GPS location data associated with one or more customer devices associated with a plurality of potential customers; and
        identifying, via the processor, the first subset of potential customers as potential customers from the plurality of potential customers having GPS location data corresponding to the provider geographic area;
    analyze, via the processor, first promotion parameter data associated with past promotion data of a plurality of past promotions stored in association with the provider, wherein analyzing the first promotion parameter data comprises:
        analyzing, via the processor, at least time of day data and day of week data from the past promotion data corresponding to a current time of day and a current day of week;
        based on analyzing the at least time of day data and day of week data, determining, via the processor, first trend data associated with the past promotion data based upon first transaction data associated with the past promotion data, wherein the first trend data indicates a first successfulness trajectory of the plurality of past promotions at the current time of day and the current day of week; and
        assigning, via the processor, one or more first weight values to the first promotion parameter data, wherein the one or more first weight values are calculated based upon the first trend data;
    determine, via the processor, a provider current status, wherein determining the provider current status comprises:
        analyzing, via the processor, non-promotional analytic data stored in association with the provider, wherein the non-promotional analytic data comprises data unrelated to the plurality of past promotions;
        based on analyzing the non-promotional analytic data, determining, via the processor, first time data comprising provider busiest time data and provider slowest time data;
        monitoring, in real-time via the processor, data transmission related to the provider device operating at the fixed location; and
        calculating, via the processor, the provider current status based at least in part on the first time data and the data transmission related to the provider device;
    generate, via the processor, at least one first promotion parameter, wherein generating the at least one first promotion parameter comprises:
        generating a plurality of potential promotion parameters, wherein each of the plurality of promotion parameters is associated with the provider located at the fixed location;
        scoring each of the plurality of potential promotion parameters based upon a distance between each of the potential customers of the first subset of potential customers and the fixed location; and
        generating an initial ranking of the plurality of potential promotion parameters, and wherein generating the at least one first promotion parameter is based at least in part upon the initial ranking of the plurality of potential promotion parameters, the provider current status, the non-promotional analytic data, the one or more first weight values and the first promotion parameter data;
    programmatically generate, via the processor, the first promotion based on the at least one first promotion parameter;
    output, to the provider device operating at the fixed location, an updated real-time promotion generation interface indicating the first promotion; and
    transmit, in real-time via the network, a first set of impressions representing the first promotion to the one or more customer devices associated with the first subset of potential customers within the provider geographic area in real-time.

2. The system of claim 1, wherein the at least one first promotion parameter includes a promotion amount.

3. The system of claim 1, wherein the at least one first promotion parameter includes promotion limitations.

4. The system of claim 1, wherein the at least one first promotion parameter includes a maximum number of promotions.

5. The system of claim 1 further configured to:
    receive, via the network from the provider device associated with the provider, an indication of provider approval of the promotion associated with the updated real-time promotion generation interface prior to transmitting the first set of impressions representing the first promotion to the one or more customer devices associated with the first subset of potential customers within the provider geographic area in real-time.

6. The system of claim 1 further configured to receive a pause indication, via the network, for pausing the promotion, wherein the pause indication for pausing the promotion is configured to be received after transmitting the first set of impressions representing the first promotion to the one or more customer devices associated with the first subset of potential customers within the provider geographic area in real-time.

7. The system of claim 1 further configured to receive an edit indication, via the network, for editing the at least one promotion parameter, wherein the edit indication for editing the at least one promotion parameter is configured to be received after transmitting the first set of impressions representing the first promotion to the one or more customer devices associated with the first subset of potential customers within the provider geographic area in real-time.

8. The system of claim 7 further configured to generate a second set of impressions comprising the first promotion, wherein the first promotion comprises at least one second promotion parameter, the second set of impressions differing from the first set of impressions.

9. The system of claim 8, wherein the at least one second promotion parameter differs from the at least one first promotion parameter.

10. The system of claim 1, further configured to analyze purchase history data associated with the provider geographic area, wherein analyzing the purchase history data associated with the provider geographic area comprises analyzing at least a purchase history associated with the first subset of potential customers within the provider geographic area.

11. The system of claim 1, wherein determining the provider current status further comprises:
determining second time data comprising provider most profitable time data and provider least profitable time data; and
calculating, via the processor, the provider current status based at least in part on the first time data, the second time data, and the data transmission related to the provider device.

12. The system of claim 1 further configured to analyze, via the processor, second promotion parameter data associated with one or more current promotions, wherein analyzing the second promotion parameter data associated with the one or more current promotions comprises:
determining second trend data in the second promotion parameter data associated with the one or more current promotions, wherein the second trend data includes second trends in the second promotion parameter data regarding a second successfulness trajectory of the one or more current promotions at the current time of day and the current day of week;
determining actual successfulness data of the one or more current promotions; and
assigning one or more second weight values to the second promotion parameter data based upon determining that the actual successfulness data of the one or more current promotions is inconsistent with the second trend data in the second promotion parameter data;
wherein the at least one first promotion parameter is generated based at least in part upon the initial ranking of the plurality of potential promotion parameters, the provider current status, the non-promotional analytic data, the one or more first weight values, the first promotion parameter data, the one or more second weight values, and the second promotion parameter data.

13. The system of claim 1 further configured to communicate with a provider point-of-sale device, wherein the provider point-of-sale device is configured to report sales information to the promotional system, and wherein the promotional system is further configured to:
analyze the sales information, and
programmatically generate the first promotion using sales information.

14. The system of claim 1, wherein generating the at least one first promotion parameter further comprises scoring the initial ranking of the plurality of potential promotion parameters based on a location of each of the plurality potential customers of the first subset of potential customers in a city to generate a further ranking of the plurality of potential promotion parameters, and wherein the at least one first promotion parameter is based upon the further ranking of the plurality of potential promotion parameters.

15. The system of claim 1, further comprising receiving consumer transaction data from a second provider in the provider geographic area,
wherein the at least one first promotion parameter is further based upon the consumer transaction data from the second provider.

16. The system of claim 15, wherein the consumer transaction data includes an umbrella purchase rate, wherein the system determines that the umbrella purchase rate in real-time is higher than historical norms, and wherein the at least one first promotion parameter comprises a discount on taxicabs.

17. The system of claim 1, wherein the provider geographic area is defined within one mile of the provider.

18. The system of claim 1, wherein the provider geographic area is defined within five miles of the provider.

19. The system of claim 1 further configured to:
determine a category and a subcategory associated with the provider;
determine a first plurality of providers having the same category and a second plurality of providers having the same subcategory; and
analyze first successfulness data associated with the first plurality of providers and second successfulness data associated with the second plurality of providers;
wherein the at least one first promotion parameter is generated based at least in part upon the initial ranking of the plurality of potential promotion parameters, the provider current status, non-promotional analytic data, the one or more first weight values, the first promotion parameter data, the first successfulness data and the second successfulness data.

20. The system of claim 1, wherein the limited time duration and limited timing period are equal to or less than 24 hours.

21. The system of claim 20, wherein the limited time duration and limited timing period are equal to or less than 3 hours.

22. The system of claim 21, wherein the limited time duration and limited timing period are equal to or less than 1 hour.

23. The system of claim 1, further configured to:
analyze customer information data associated with the first subset of potential customers within the provider geographic area in real-time;
based on analyzing customer information data associated with the first subset of potential customers, determine at least one second promotion parameter and define a second subset of potential customers, wherein the second subset of potential customers is at least a portion of the first subset of potential customers, programmatically generate, via the processor, a second promotion based on the at least one second promotion parameter, wherein the at least one second promotion parameter differs from the at least one first promotion parameter; and transmit, in real-time via the network, one or more impressions representing the second promotion to one or more customer devices associated with the second subset of potential customers within the provider geographic area in real-time.

24. The system of claim 23, wherein customer information data comprises at least one or more of demographic profile data, preference data, and past transaction data.

25. The system of claim 10, further configured to:

based on analyzing at least a purchase history associated with the first subset of potential customers within the provider geographic area in real-time, determine, via the processor, at least one second promotion parameter and define a second subset of potential customers, wherein the second subset of potential customers is at least a portion of the first subset of potential customers;

programmatically generate, via the processor, a second promotion based on the at least one second promotion parameter, wherein the at least one second promotion parameter differs from the at least one first promotion parameter, and;

transmit, in real-time via the network, one or more impressions representing the second promotion to one or more customer devices associated with the second subset of potential customers within the provider geographic area in real-time.

* * * * *